US011110928B2

(12) United States Patent
Kawasaki et al.

(10) Patent No.: US 11,110,928 B2
(45) Date of Patent: Sep. 7, 2021

(54) INFORMATION PROCESSING APPARATUS, VEHICLE, INFORMATION PROCESSING METHOD, AND COMPUTER PROGRAM PRODUCT

(71) Applicant: Kabushiki Kaisha Toshiba, Minato-ku (JP)

(72) Inventors: Atsushi Kawasaki, Yokohama (JP); Tsuyoshi Tasaki, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 534 days.

(21) Appl. No.: 15/897,657

(22) Filed: Feb. 15, 2018

(65) Prior Publication Data
US 2019/0009783 A1    Jan. 10, 2019

(30) Foreign Application Priority Data
Jul. 7, 2017    (JP) .............................. JP2017-133683

(51) Int. Cl.
*B60W 30/18*    (2012.01)
*G08G 1/01*    (2006.01)
(Continued)

(52) U.S. Cl.
CPC .... *B60W 30/18154* (2013.01); *B60W 30/143* (2013.01); *B60W 30/18145* (2013.01);
(Continued)

(58) Field of Classification Search
CPC ......... B60W 30/143; B60W 30/18145; B60W 30/18154; B60W 30/18159;
(Continued)

(56) References Cited

U.S. PATENT DOCUMENTS

| 5,555,503 A * | 9/1996 | Kyrtsos ................. G01S 19/47 |
| | | 701/518 |
| 2013/0013164 A1 * | 1/2013 | Taguchi ............ B60W 50/0097 |
| | | 701/96 |

(Continued)

FOREIGN PATENT DOCUMENTS

| JP | 2000-333060 | 11/2000 |
| JP | 2006-146783 | 6/2006 |

(Continued)

OTHER PUBLICATIONS

Hideki Nakamura. et al. "The technology research development result report report which contributes to the progression in quality of the road policy" New Road Technology Meeting, Jul. 2015, pp. 61 (with Partial Machine Generated English Translation).

(Continued)

*Primary Examiner* — Ryan A Reis
(74) *Attorney, Agent, or Firm* — Oblon, McClelland, Maier & Neustadt, L.L.P.

(57) ABSTRACT

According to an embodiment, an information processing apparatus includes one or more processors configured to: acquire a dynamic state related to traveling of a moving object entering an intersection; acquire intersection information indicating a configuration of the intersection; specify a reference route along which the moving object is predicted to travel at the intersection, based on the dynamic state and the intersection information; detect a speed control point that is a position included in the specified reference route; and generate a speed model representing a temporal change in a predicted speed of the moving object so that the speed at the speed control point is locally minimized, based on the dynamic state and the intersection information.

18 Claims, 11 Drawing Sheets

(51) Int. Cl.
*B60W 50/00* (2006.01)
*G08G 1/0962* (2006.01)
*G08G 1/04* (2006.01)
*B60W 30/14* (2006.01)
*G01C 21/36* (2006.01)
*B60W 40/10* (2012.01)
*G01C 21/34* (2006.01)

(52) U.S. Cl.
CPC .............. *B60W 40/10* (2013.01); *G01C 21/34* (2013.01); *G01C 21/3655* (2013.01); *G08G 1/0112* (2013.01); *G08G 1/04* (2013.01); *G08G 1/0962* (2013.01); *B60W 50/0097* (2013.01); *B60W 2520/06* (2013.01); *B60W 2552/30* (2020.02); *B60W 2555/60* (2020.02); *B60W 2720/103* (2013.01)

(58) Field of Classification Search
CPC ............... B60W 40/072; B60W 40/10; B60W 50/0097; B60W 2520/06; B60W 2552/30; B60W 2720/103; G01C 21/34; G08G 1/0112
See application file for complete search history.

(56) References Cited

U.S. PATENT DOCUMENTS

| | | | | |
|---|---|---|---|---|
| 2014/0244114 | A1* | 8/2014 | Matsubara | G08G 1/165 701/41 |
| 2014/0336587 | A1* | 11/2014 | McLoughlin | A61M 5/326 604/192 |
| 2015/0185028 | A1* | 7/2015 | Kinoshita | G01C 21/3484 701/400 |
| 2015/0336587 | A1* | 11/2015 | Inoue | B60W 10/20 701/41 |

FOREIGN PATENT DOCUMENTS

| | | |
|---|---|---|
| JP | 2006-273230 | 10/2006 |
| JP | 2015-138330 | 7/2015 |
| WO | WO 2014/045355 A1 | 3/2014 |

OTHER PUBLICATIONS

Axel Wolfermann et al. "Modeling speed profiles of turning vehicles at signalized intersections" International Conference on Road Safety and Simulation, Sep. 2011, pp. 17.

* cited by examiner

INFORMATION PROCESSING APPARATUS, VEHICLE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-133683, filed on Jul. 7, 2017; the entire contents of which are incorporated herein by reference.

FIELD

Embodiments described herein relate generally to an information processing apparatus, a vehicle, an information processing method, and a computer program product.

BACKGROUND

For example, in a field of automatic driving or the like, in a case where a vehicle travels at an intersection, it is required to predict how other vehicles travel. However, at the intersection, the vehicles complicatedly change the speeds. For this reason, it has been difficult for the vehicle to predict how other vehicles travel.

BRIEF DESCRIPTION OF THE DRAWINGS

FIG. 4 is a diagram illustrating an example of reference routes and the like.

DETAILED DESCRIPTION

According to an embodiment, an information processing apparatus includes one or more processors configured to: acquire dynamic state related to traveling of a moving object entering an intersection; acquire intersection information indicating a configuration of the intersection; specify a reference route along which the moving object is predicted to travel at the intersection, based on the dynamic state and the intersection information; detect a speed control point that is a position included in the specified reference route; and generate a speed model representing a temporal change in a predicted speed of the moving object so that the speed at the speed control point is locally minimized, based on the dynamic state and the intersection information.

Hereinafter, embodiments will be described with reference to the accompanying drawings. An information processing apparatus 10 according to an embodiment accurately predicts a speed of a moving object at an intersection. The moving object is, for example, another vehicle.

Figure 1:
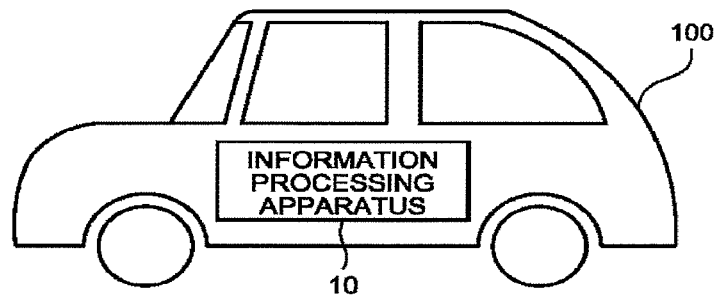
FIG. 1 is a diagram illustrating a vehicle according to an embodiment.

FIG. 1 is a diagram illustrating a vehicle 100 according to the embodiment. The vehicle 100 includes the information processing apparatus 10. The information processing apparatus 10 is, for example, an apparatus including a dedicated or general purpose computer. In the information processing apparatus 10, an information processing function may not be mounted on the vehicle 100 but may be mounted on another apparatus such as a cloud. The information processing apparatus 10 may be provided not in the vehicle 100 but in another type of a moving object such as a robot or a drone. The vehicle 100 may be, for example, a normal vehicle traveling through driving operations by a person or may be an automatically driven vehicle capable of automatically traveling without intervention by driving operations by a person (capable of autonomously traveling).

Figure 2:
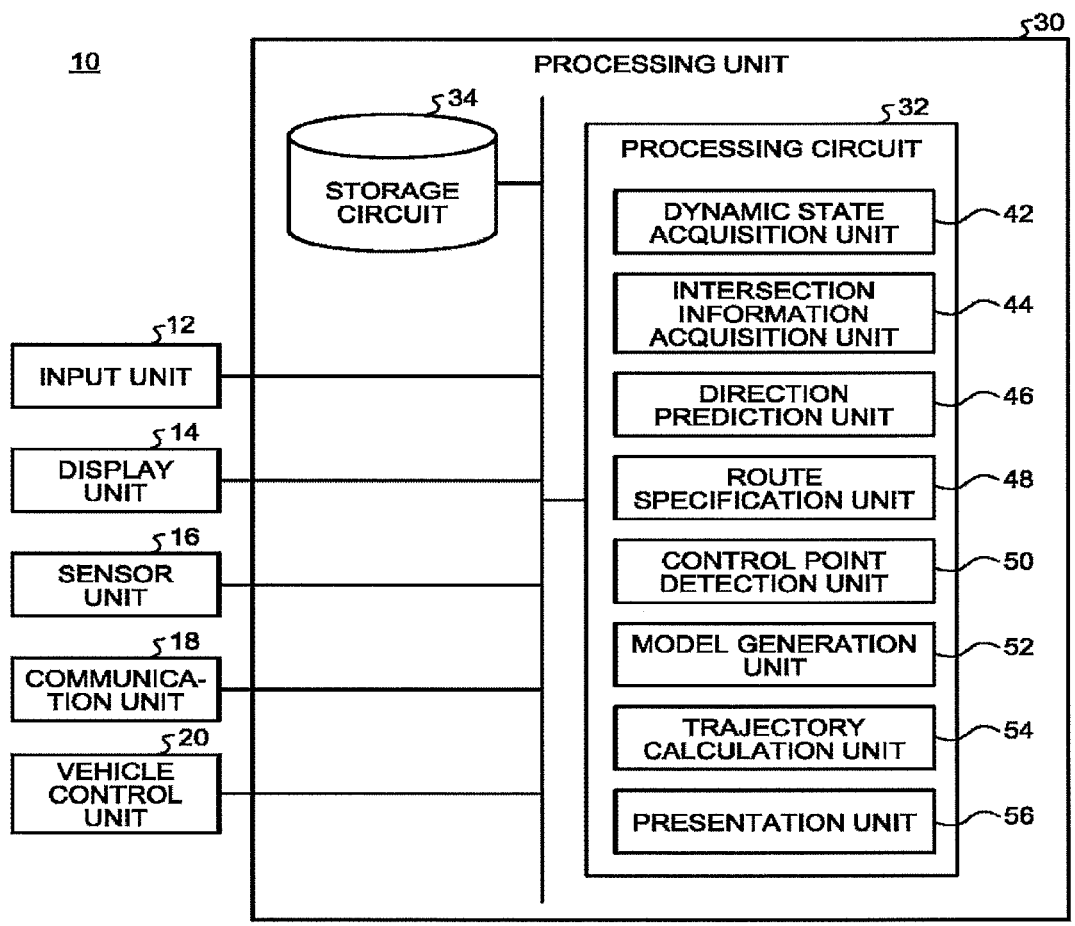
FIG. 2 is a configuration diagram of an information processing apparatus according to an embodiment.

FIG. 2 is a diagram illustrating an example of a configuration of the information processing apparatus 10 according to the embodiment. The information processing apparatus 10 includes an input unit 12, a display unit 14, a sensor unit 16, a communication unit 18, a vehicle control unit 20, and a processing unit 30.

The input unit 12 receives instructions from a user and information input. The input unit 12 is, for example, an operation panel, a pointing device such as a mouse or a trackball, or an input device such as a keyboard.

The display unit 14 displays various kinds of information. The display unit 14 is, for example, a display device such as a liquid crystal display.

The sensor unit 16 includes one or more types of sensors for detecting a position, speed, acceleration, angular speed, or the like of the surrounding moving objects (for example, other vehicles). For example, the sensor unit 16 may include a sonar that detects surrounding moving objects with sound waves. For example, the sensor unit 16 may include a stereoscopic camera for acquiring the position in the depth direction of the surrounding moving object. For example, the sensor unit 16 may include a millimeter wave radar for measuring a distance to the surrounding moving object or a LIDAR sensor for detecting a position (for example, a distance and angle from the own vehicle) of the surrounding moving object. The sensor unit 16 may include sensors other than these sensors in order to detect the position, speed, acceleration, angular speed, and the like of the surrounding moving object (for example, another vehicle).

The communication unit 18 is an interface that communicates information with external devices through, for example, wireless communication. The communication unit 18 may perform wireless communication with other vehicles, roadside devices, or the like. The communication unit 18 may access a server or the like via a network.

The vehicle control unit 20 controls a driving mechanism for driving the own vehicle. For example, in a case where the vehicle 100 is an automatically driven vehicle, the surrounding situation is determined based on the information obtained from the sensor unit 16 and other information, and an accelerating amount, a braking amount, a steering angle, and the like are controlled. In a case where the vehicle 100 is a normal vehicle traveling through driving operations by a person, the vehicle control unit 20 controls the accelerating amount, the braking amount, the steering angle, and the like according to operation information.

The processing unit 30 is, for example, a dedicated or general purpose computer. The processing unit 30 manages and controls the input unit 12, the display unit 14, the sensor unit 16, the communication unit 18, and the vehicle control unit 20.

The processing unit 30 includes a processing circuit 32 and a storage circuit 34. The processing circuit 32 and the storage circuit 34 are connected to each other via a bus. The processing circuit 32 is connected to the input unit 12, the display unit 14, the sensor unit 16, the communication unit 18, and the vehicle control unit 20, for example, via a bus.

The processing circuit 32 is, for example, one or a plurality of processors, and reads a program from the storage circuit 34 and executes the program to implement a function corresponding to the program. In the present embodiment, the processing circuit 32 executes a prediction program for predicting the speed of the surrounding moving object at the intersection. The processing circuit 32 in the state of reading and executing this prediction program includes each component illustrated in the processing circuit 32 in FIG. 2. That is, the processing circuit 32 executes the prediction program to function as a dynamic state acquisition unit 42, an intersection information acquisition unit 44, a direction prediction unit 46, a route specification unit 48, a control point detection unit 50, a model generation unit 52, a trajectory calculation unit 54, and a presentation unit 56. Details of these components will be described later.

The term "processor" denotes, for example, a central processing unit (CPU), a graphical processing unit (GPU), an application specific integrated circuit (ASIC), a programmable logic device (for example, a simple programmable logic device (SPLD), a complex programmable logic device (CPLD), and a field programmable gate array (FPGA)), or the like. The processor implements a function by reading and executing a program stored in the storage circuit 34. Instead of storing the program in the storage circuit 34, the program may be configured to be directly incorporated in circuit of the processor. In this case, the processor implements the function by reading and executing the program incorporated in the circuit.

The storage circuit 34 stores a program for allowing the processing circuit 32 to function as the dynamic state acquisition unit 42, the intersection information acquisition unit 44, the direction prediction unit 46, the route specification unit 48, the control point detection unit 50, the model generation unit 52, the trajectory calculation unit 54 and the presentation unit 56. The storage circuit 34 stores data and the like accompanied with each processing function performed by the processing circuit 32, as necessary.

For example, the storage circuit 34 is a semiconductor memory element such as a random access memory (RAM) or a flash memory, a hard disk, an optical disk, or the like. Some or all of the functions of the storage circuit 34 may be implemented by a storage device outside the processing unit 30. The storage circuit 34 may be a storage medium that stores or temporarily stores a program transmitted and downloaded via a local area network (LAN), the Internet, or the like. The storage circuit 34 may be configured with one storage medium or may be configured with a plurality of storage media. The storage circuit 34 may be configured with a plurality of types of storage media.

Figure 3:
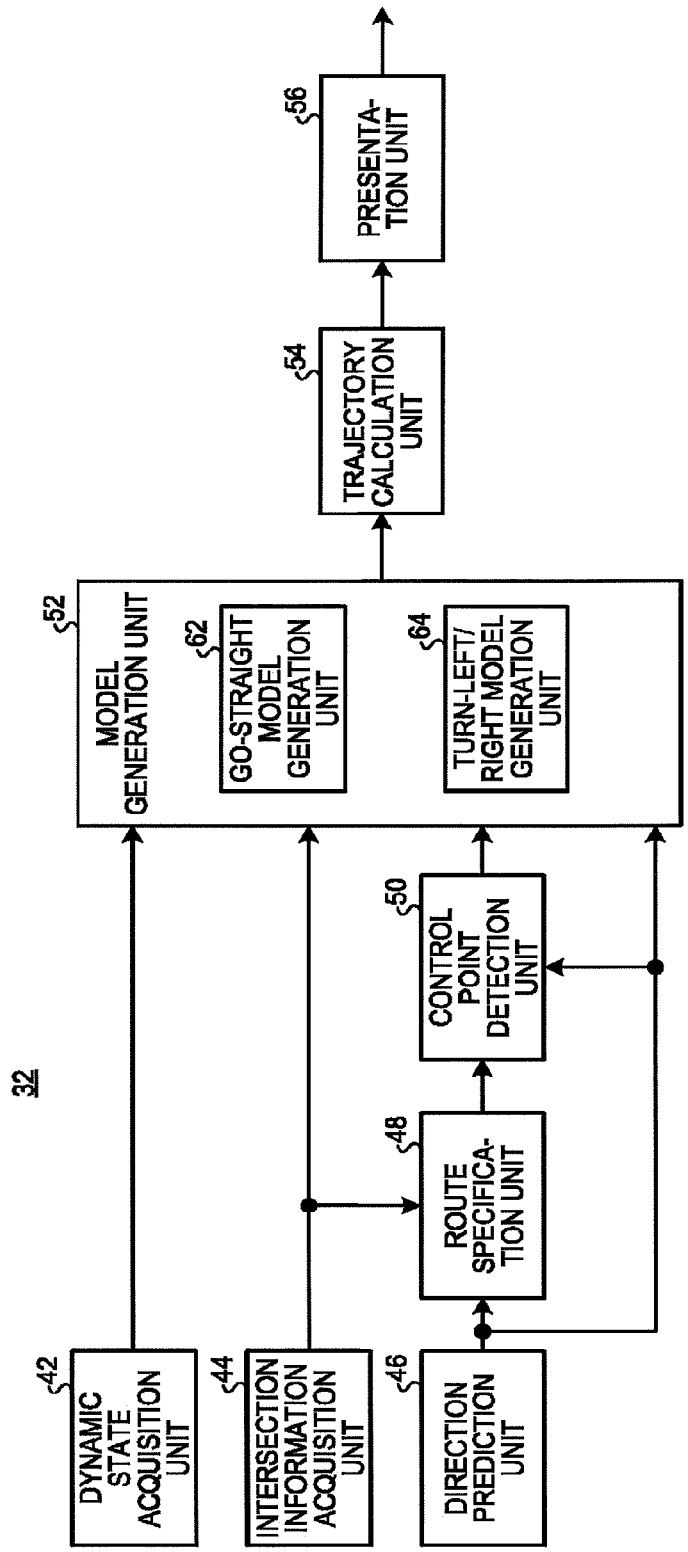
FIG. 3 is a functional configuration diagram of a processing circuit.

FIG. 3 is a diagram illustrating a functional configuration of the processing circuit 32. At the intersection, the processing circuit 32 executes a prediction program for predicting the speed of the moving object which is a surrounding other vehicle or the like. The processing circuit 32 that has executed the prediction program includes the dynamic state acquisition unit 42, the intersection information acquisition unit 44, the direction prediction unit 46, the route specification unit 48, the control point detection unit 50, the model generation unit 52, the trajectory calculation unit 54, and the presentation unit 56.

Herein, the intersection is an area where a plurality of roads (traveling roads of moving objects) intersect. A moving object that has entered the intersection is to turn right or left and progress to another road or is to go straight to progress along the road. In the present embodiment, the moving object is a vehicle. However, the moving object is not limited to a vehicle, but the moving object may be a robot or a drone moving along a traveling road.

The dynamic state acquisition unit 42 specifies the moving object entering the intersection as a target for speed prediction. For example, the dynamic state acquisition unit 42 specifies another vehicle before entering the intersection as a target moving object. In addition, for example, the dynamic state acquisition unit 42 may specify another vehicle that is passing through the intersection as a target moving object.

Then, the dynamic state acquisition unit 42 acquires a dynamic state on the travel of the target moving object. For example, the dynamic state acquisition unit 42 acquires observation data such as the position, speed, and acceleration of the target moving object as dynamic state of the target moving object at regular time intervals. The dynamic state acquisition unit 42 acquires the dynamic state based on the information detected by the sensor unit 16.

The intersection information acquisition unit 44 acquires intersection information indicating the configuration of the intersection where the target moving object enters. The intersection information acquisition unit 44 may read the intersection information stored in the storage circuit 34 or acquire the intersection information from an external server or the like through the communication unit 18.

Figure 4:
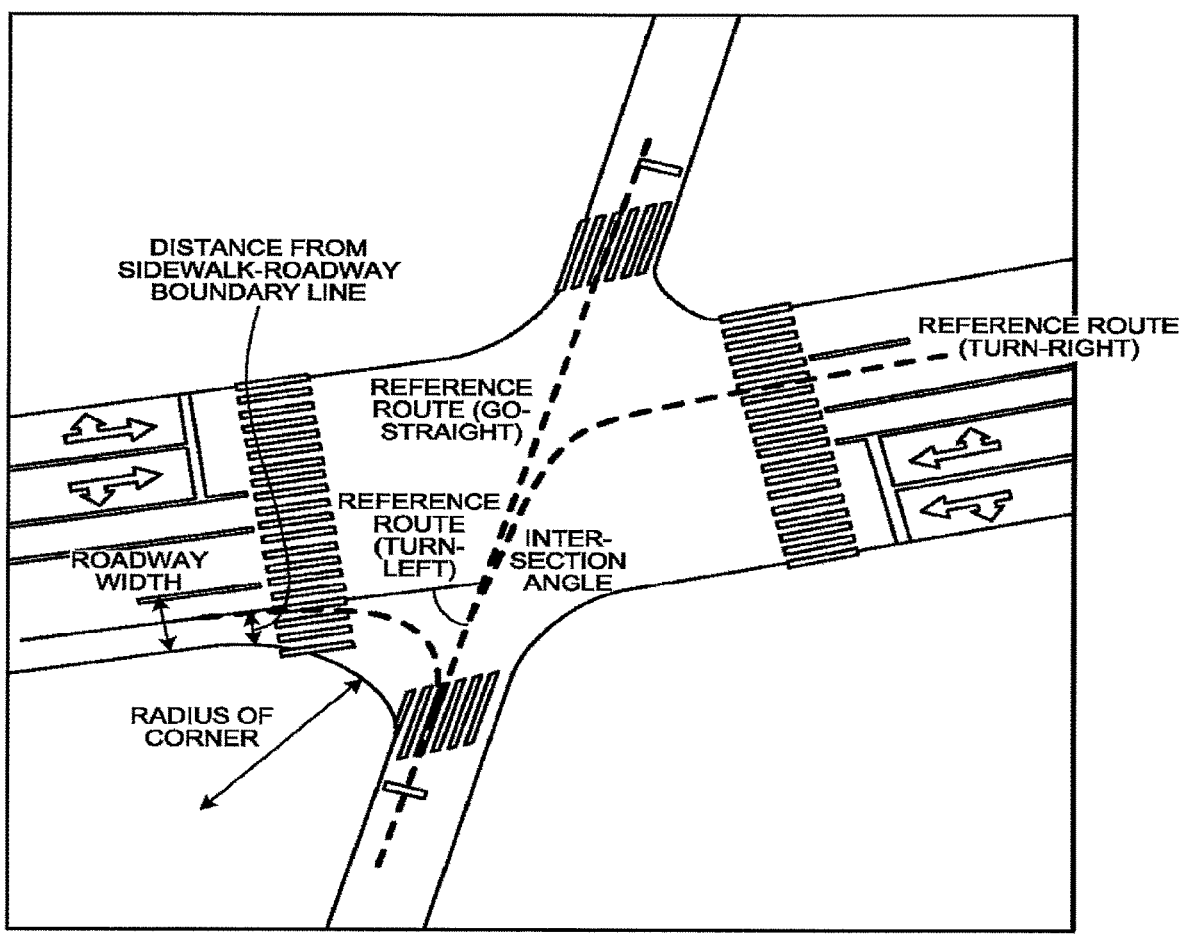

As illustrated in FIG. 4, for example, the intersection information includes information on the shape and the like of the intersection, such as a plurality of reference routes, intersection angles, radius of corners, roadway widths, and distances from sidewalk-roadway boundary lines. Furthermore, the intersection information may also include information on the signs of the intersection, such as contents, display positions, and the like of crosswalk signs and road signs at the intersection.

The reference route represents a travel route of the moving object within the intersection. The reference route may be a point sequence representing positions or may be a curve parameter such as a spline curve or a clothoid curve. The intersection information includes information on all reference routes along which traveling can be allowed at the intersection. For example, the intersection information on the intersection where two roads intersect includes reference routes of go-straight, turn-right, and turn-left for each inflow port.

The intersection angle represents an angle of the two intersecting roads. The radius of the corner represents a radius of the arc formed at the corner at the intersection. The radius of the corner may be a value obtained by subtracting a value of ½ of the roadway width from the radius of curvature at the position at which the curvature of the reference route is maximized. The intersection information acquisition unit 44 may calculate an approximate value of the radius of the corner by using other methods. The distance from the sidewalk-roadway boundary line represents a distance from a boundary line between a sidewalk and a roadway to the reference route.

The direction prediction unit 46 predicts in which direction the target moving object travels within the intersection. For example, the direction prediction unit 46 predicts whether the target moving object goes straight, turns right, or turns left. For example, the direction prediction unit 46 recognizes the blinking of the blinker provided in the target moving object based on the image of the target moving object imaged by the sensor unit 16 and predicts whether the target moving object goes straight, turns right, or turns left. The direction prediction unit 46 may predict whether the target moving object goes straight, turns right, or turns left based on the information acquired from the target moving object through inter-vehicle communication. Alternatively or additionally, the direction prediction unit 46 may predict whether the target moving object goes straight, turns right, or turns left, according to a change in speed and a change in angular speed of the target moving object.

The route specification unit 48 specifies a reference route along which the target moving object is predicted to travel at the intersection based on the dynamic state of the target moving object, a prediction result of the direction in which the target moving object is to travel, and the intersection information. For example, the route specification unit 48 specifies, from among the plurality of reference routes included in the intersection information, one reference route along which the target moving object is predicted to travel based on a prediction result of the position of the target moving object and the direction in which the target moving object is to progress. In a case where the direction in which the target moving object is to travel cannot be predicted, the route specification unit 48 may specify two or more reference routes along which the target moving object may travel.

Figure 5:
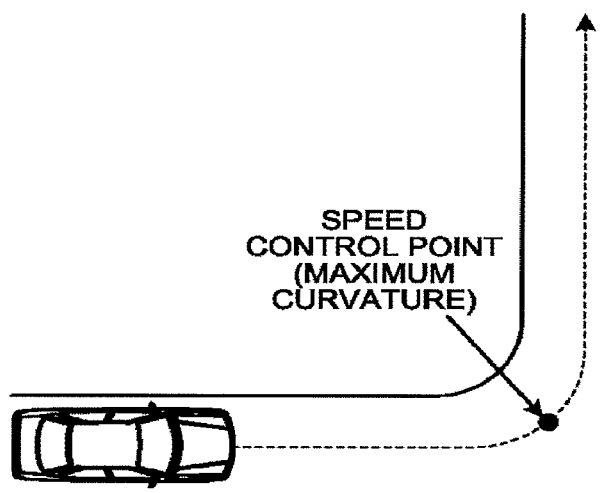
FIG. 5 is a diagram illustrating an example of a speed control point.

The control point detection unit 50 detects a speed control point which is a position included in the reference route specified by the route specification unit 48. For example, the speed control point represents a position at which it is predicted that a positive or negative sign of the acceleration of the target moving object is reversed in the reference route. For example, as illustrated in FIG. 5, the control point detection unit 50 detects, as a speed control point, a position having the maximum curvature in the specified reference route. In this case, the control point detection unit 50 analyzes the shape of the specified reference route to detect the position having the maximum curvature.

The model generation unit 52 generates a speed model representing a temporal change in the predicted speed of the target moving object based on the specified reference route, the dynamic state, the intersection information and the speed control point. The model generation unit 52 includes a go-straight model generation unit 62 and a turn-left/right model generation unit 64.

In a case where it is determined that the target moving object goes straight at the intersection, the go-straight model generation unit 62 generates a speed model based on the specified reference route, the dynamic state and the intersection information. For example, the go-straight model generation unit 62 generates a model in which the speed approaches a stable speed by causing the acceleration to be gradually close to zero. For example, the go-straight model generation unit 62 may generate a model representing a constant speed motion, a constant acceleration motion, or the like. For example, the go-straight model generation unit 62 calculates, as a speed model, a function with time as a variable.

In a case where it is determined that the target moving object turns left or turns right at the intersection, the turn-left/right model generation unit 64 generates a speed model in which the speed at the speed control point is locally minimized based on the specified reference route, dynamic state and intersection information. The term "local minimum" denotes a peak point of a waveform that has a peak downward.

Specifically, the turn-left/right model generation unit 64 generates a first speed model representing a temporal change in the predicted speed of the target moving object up to the speed control point and a second speed model representing the temporal change in the predicted speed of the target moving object after the speed control point. For example, the turn-left/right model generation unit 61 calculates a function with time as a variable and a second speed model. For example, the turn-left/right model generation unit 64 calculates cubic functions with time as a variable as a first speed model and a second speed model. By generating the speed model, the model generation unit 52 can predict the speed of the target moving object at an arbitrary time in the future.

The trajectory calculation unit 54 calculates a predicted movement trajectory of the target moving object based on the speed model generated by the model generation unit 52 and the specified reference route. The presentation unit 56 draws the predicted movement trajectory calculated by the trajectory calculation unit 54 on, for example, map information and causes the display unit 14 to display the predicted movement trajectory. The presentation unit 56 may generate the map information based on each information detected by the sensor unit 16 or may acquire the map information from a server or the like via a network. By causing the predicted movement trajectory to be displayed on the display unit 14, the presentation unit 56 can present how the target moving object moves to the driver of the own vehicle.

Figure 6:
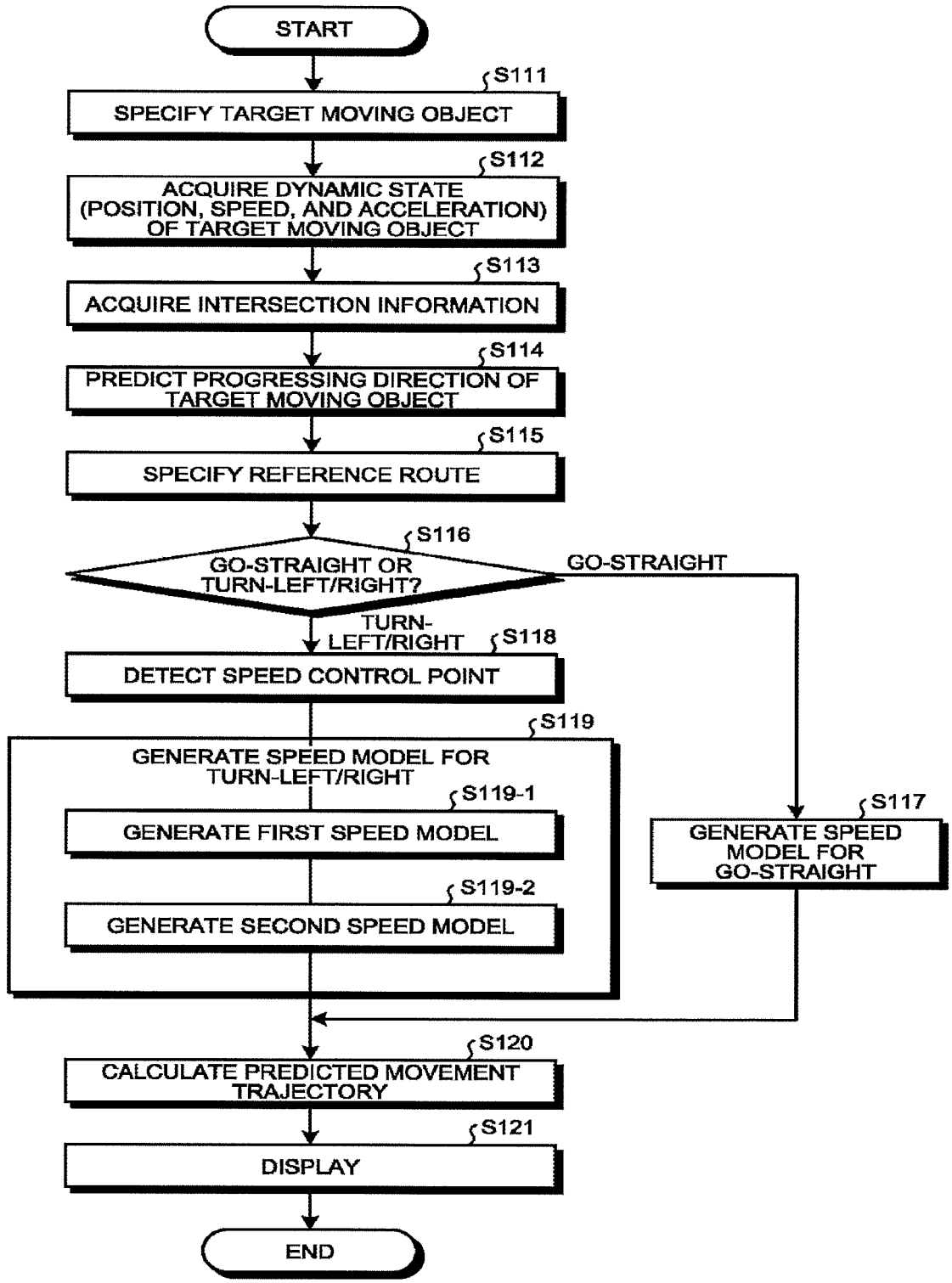
FIG. 6 is a flowchart illustrating a flow of processes of the information processing apparatus according to the embodiment.

FIG. 6 is a flowchart illustrating the flow of processes of the information processing apparatus 10 according to the embodiment. The information processing apparatus 10 executes the processes in the flow illustrated in FIG. 6.

First, in step S111, the information processing apparatus 10 specifies one of the moving objects entering the intersection as a target moving object. Subsequently, in step S112, the information processing apparatus 10 acquires dynamic state of the target moving object. The information processing apparatus 10 acquires the position, speed, and acceleration of the target moving object, for example, at predetermined intervals.

Subsequently, in step S113, the information processing apparatus 10 acquires the intersection information representing the configuration of the intersection where the target moving object enters. For example, the information processing apparatus 10 acquires intersection information including a plurality of reference routes, intersection angles, radius of corners, roadway widths, distances from the sidewalk-roadway boundary line.

Subsequently, in step S114, the information processing apparatus 10 predicts in which direction the target moving object progresses within the intersection. For example, the information processing apparatus 10 predicts whether the target moving object goes straight, turns right, or turns left within the intersection.

Subsequently, in step S115, the information processing apparatus 10 specifies the reference route along which the target moving object is predicted to travel at the intersection based on the dynamic state of the target moving object, a prediction result of the direction in which the target moving object is to travel, and the intersection information. The information processing apparatus 10 specifies, from among the plurality of reference routes included in the intersection information, one reference route along which the target moving object is predicted to travel based on a prediction result of the position of the target moving object and the direction in which the target moving object is to progress.

Subsequently, in step S116, the information processing apparatus 10 determines whether to go straight or turn left or right. In the case of going straight, the information processing apparatus 10 proceeds to the process of step S117. In the case of turning left or turning right, the information processing apparatus 10 proceeds to the process of step S116.

In step S117, the information processing apparatus 10 generates a speed model of the target moving object in the case of going straight at the intersection based on the specified reference route, the dynamic state, and the intersection information. For example, the information processing apparatus 10 generates a model where the speed approaches a stable speed by allowing the acceleration to be gradually close to zero. For example, the information processing apparatus 10 may generate a model representing a constant speed motion, a constant acceleration motion, or the like. When the process of step S117 is completed, the information processing apparatus 10 proceeds to the process of step S120.

In step S110, the information processing apparatus 10 detects a speed control point which is a position included in the specified reference route. For example, the control point detection unit 50 detects, as a speed control point, a position at which it is predicted that the positive or negative sign of the acceleration of the target moving object is reversed in the reference route. For example, the control point detection unit 50 detects, as a speed control point, a position having the maximum curvature in the specified reference route.

Subsequently, in step S119, the information processing apparatus 10 generates a speed model of the target moving object in the case of turning left or turning right at the intersection based on the specified reference route, the speed control point, the dynamic state, and the intersection information. In this case, the information processing apparatus 10 generates a speed model in which the speed at the speed control point is locally minimized.

In the process of step S119, the information processing apparatus 10 executes the processes of step S119-1 and step S119-2. Specifically, first, in step S119-1, the information processing apparatus 10 generates a first speed model representing a temporal change in the predicted speed of the target moving object up to the speed control point. Subsequently, in step S119-2, the information processing apparatus 10 generates a second speed model representing a temporal change in the predicted speed of the target moving object after the speed control point.

Figure 7:
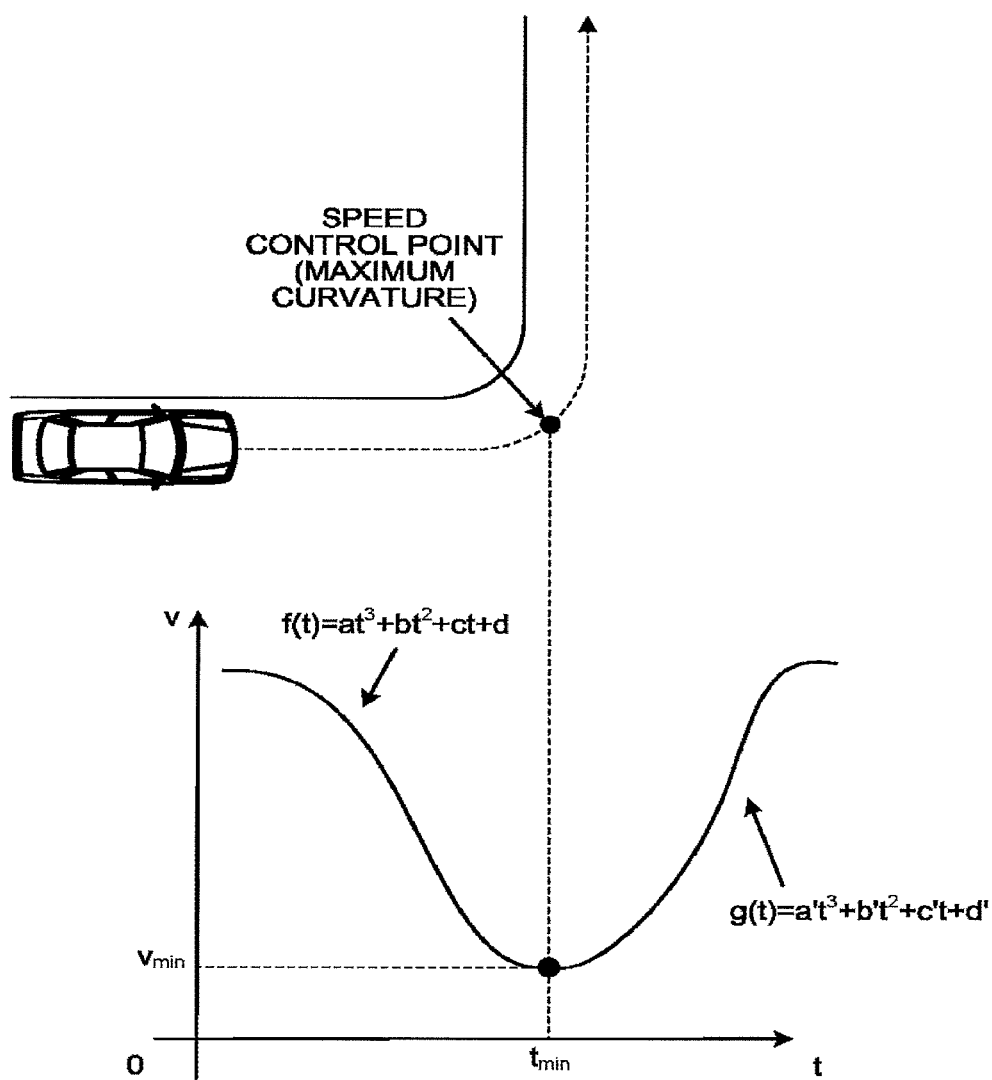
FIG. 7 is a diagram illustrating an example of a first speed model and a second speed model.

As illustrated in FIG. 7, in the present embodiment, the first speed model is a cubic function $(f(t)=at^3+bt^2+ct+d)$ with time (t) as a variable. In the present embodiment, the second speed model is a cubic function $(g(t)=a't^3+b't^2+c't+d')$ with time (t) as a variable.

At the passing time $(t_{min})$ through the speed control point, the first speed model and the second speed model represent the same speed and the predicted speed is locally minimized $(v_{min})$. The method of generating the first speed model will be further described with reference to FIG. 8. The method of generating the second speed model will be further described with reference to FIG. 10.

When the process of step S119 is completed, the information processing apparatus 10 proceeds to the process of step S120. In step S120, the information processing apparatus 10 calculates a predicted movement trajectory of the target moving object based on the generated speed model and the specified reference route. Subsequently, in step S121, the information processing apparatus 10 draws the calculated predicted movement trajectory on, for example, the map information, and allows the display unit 14 to display the predicted movement trajectory. When the process of step S121 is completed, the information processing apparatus 10 ends the process for the target moving object.

Figure 8:
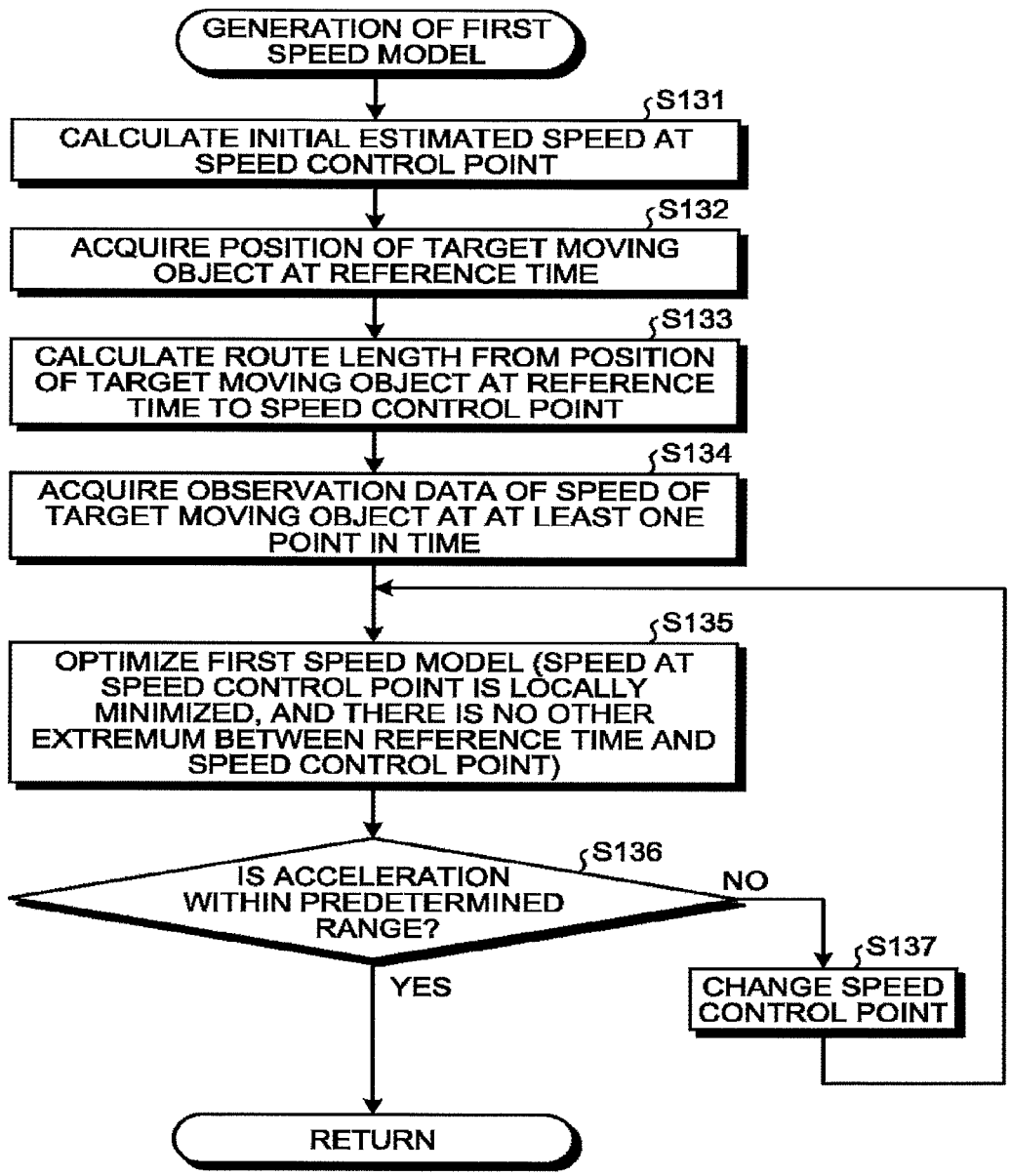
FIG. 8 is a flowchart illustrating a flow of a generation process of the first speed model.

FIG. 8 is a flowchart illustrating the flow of the generation process of the first speed model. The model generation unit 52 generates the first speed model with the flow of the process illustrated in FIG. 8.

First, in step S131, the model generation unit 52 calculates the initial estimated speed at the speed control point. For example, the model generation unit 52 calculates the initial estimated speed of the target moving object at the speed control point based on the inflow speed, the intersection angle, the radius of the corner, and the distance from the sidewalk-roadway boundary line.

For example, the model generation unit 52 sets, as the initial estimated speed, a value obtained by adding all values obtained by multiplying the inflow speed, the intersection angle, the radius of the corner, and the distance from the sidewalk-roadway boundary line by their corresponding coefficients and further adding a constant to the addition result. More specifically, the model generation unit 52 calculates the following Mathematical Formula (1).

$$x=a_1X_1+a_2X_2+a_3X_3+a_4X_4+a_5 \quad (1)$$

In the Mathematical Formula (1), x indicates the initial estimated speed of the target moving object at the speed control point. $X_1$ indicates the inflow speed. $X_2$ indicates the intersection angle. $X_3$ indicates the radius of the corner. $X_4$ indicates the distance from the sidewalk-roadway boundary line.

Furthermore, $a_1$, $a_2$, $a_3$, and $a_4$ are coefficients and is a constant. These coefficients and constant are values estimated from data obtained by actually measuring the moving object passing through the intersection. These coefficients and constant are included in, for example, the intersection information. The model generation unit 52 acquires these coefficients and constant from the intersection information.

The inflow speed is a speed of the target moving object at the time of entering the intersection. Specifically, the inflow speed is a speed of the target moving object at the inflow port of the intersection. For example, the model generation unit 52 acquires observation data of the speed of the target moving object at the inflow port of the intersection from among the dynamic state acquired by the dynamic state acquisition unit 42. The non-patent literature described above discloses that the minimum speed at the time of turning left or turning right at the intersection can be estimated based on the inflow speed, the intersection angle, the radius of the corner, and distance from the sidewalk-roadway boundary line.

Subsequently, in step S132, the model generation unit 52 acquires a position of the target moving object at a reference time. The reference time is a time which is a reference for the speed estimation of the target moving object. The reference time may be, for example, the current time or may be the time when the position, speed, acceleration, or the like of the target moving object was last observed. For example, the model generation unit 52 acquires observation data of the position of the target moving object at the reference time from among the dynamic state acquired by the dynamic state acquisition unit 42.

Subsequently, in step S133, the model generation unit 52 calculates a route length from the position of the target moving object at the reference time to the speed control point, based on the specified reference route. That is, the model generation unit 52 calculates a movement distance in a case where the target moving object moves on the specified reference route from the position of the target moving object at the reference time to the speed control point.

Subsequently, in step S134, the model generation unit 52 acquires observation data of the speed of the target moving object at least one point in time before the reference time based on previous dynamic state of the target moving object. For example, the model generation unit 52 acquires the observation data of the speed of the target moving object from the dynamic state of N (N is an integer of 1 or more) samples before the reference time.

Figure 9:
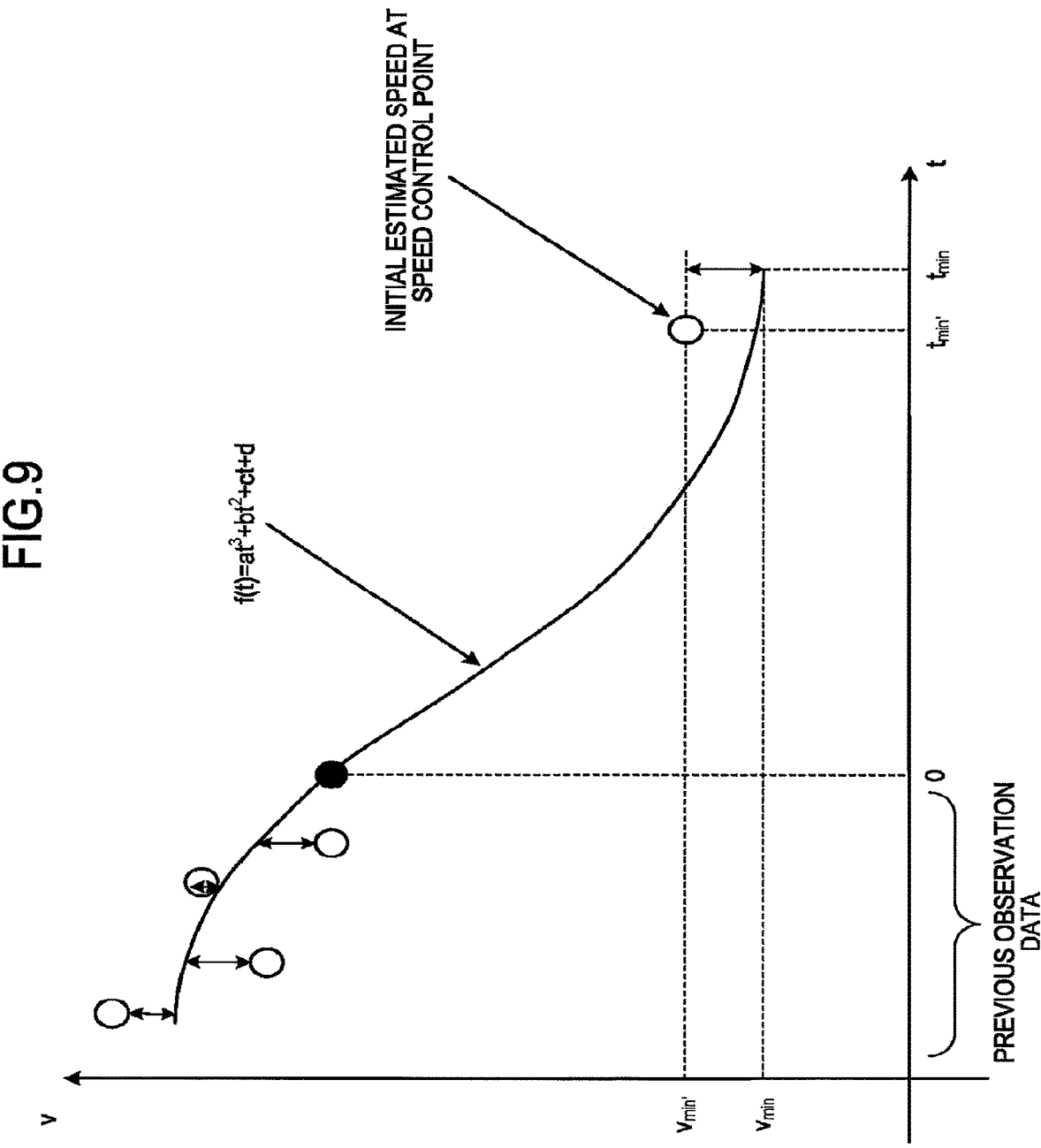
FIG. 9 is a diagram illustrating an optimization process of the first speed model.

Subsequently, in step S135, the model generation unit 52 optimizes the first speed model so that errors of the observation data of the initial estimated speed of the moving object at the speed control point and the speed of the moving object at the at least one point in time become small. For example, as illustrated in FIG. 9, the model generation unit 52 optimizes the coefficients (a, b, c, d) in the first speed model represented by the cubic function ($f(t)=at^3+bt^2+ct+d$) so that square errors of the observation data of the initial estimated speed at the speed control point and the speed of the moving object at least one point in time are minimized.

Herein, the model generation unit 52 optimizes the first speed model under a constraint condition that the speed at the speed control point is locally minimized. More specifically, the model generation unit 52 determines the time at which the differential value of the first speed model becomes zero and the differential value is reversed from negative to positive as a time at which the speed is locally minimized. Then, the model generation unit 52 optimizes the first speed model so that the integral value from the reference time in the first speed model to the time at which the speed is locally minimized is matched with the route length calculated in step S133.

The model generation unit 52 optimizes the first speed model so that there is no other extremum between the reference time and the speed control point. More specifically, the model generation unit 52 optimizes the first speed model so that there is no point at which the differential value is zero between the reference time and the time at the speed control point.

In a case where the observation data of the speed of the target moving object at the reference time has been acquired, the model generation unit 52 may optimize the first speed model so that the speed at the reference time is matched with the observation data.

Furthermore, in a case where the observation data of the acceleration of the target moving object at the reference time has been acquired, the model generation unit 52 may optimize the first speed model so that the acceleration at the reference time is matched with the observation data. More specifically, the model generation unit 52 optimizes the first speed model so that the differential value at the reference time of the first speed model is matched with the observation data of the acceleration at the reference time.

Subsequently, in step S136, the model generation unit 52 determines whether or not the acceleration (differential value) between the reference time and the time at the speed control point obtained from the optimized first speed model is within a predetermined range. For example, the model generation unit 52 determines whether or not the absolute value of the acceleration obtained from the first speed model exceeds a general range of the acceleration at the time of deceleration of the vehicle.

When the acceleration is not within the predetermined range (No in step S136), the model generation unit 52 proceeds to the process of step S137. Then, in step S137, the model generation unit 52 changes the speed control point. For example, in a case where the absolute value of the acceleration obtained from the first speed model exceeds general range of the acceleration at the time of deceleration of the vehicle, the model generation unit 52 shifts the speed control point by a predetermined distance to a forward position on the reference route. Then, the model generation unit 52 proceeds to the process of step S135 again to optimize the first speed model.

Then, in a case where the acceleration is within the predetermined range (Yes in step S136), the model generation unit 52 ends the generation process of the first speed model.

Figure 10:
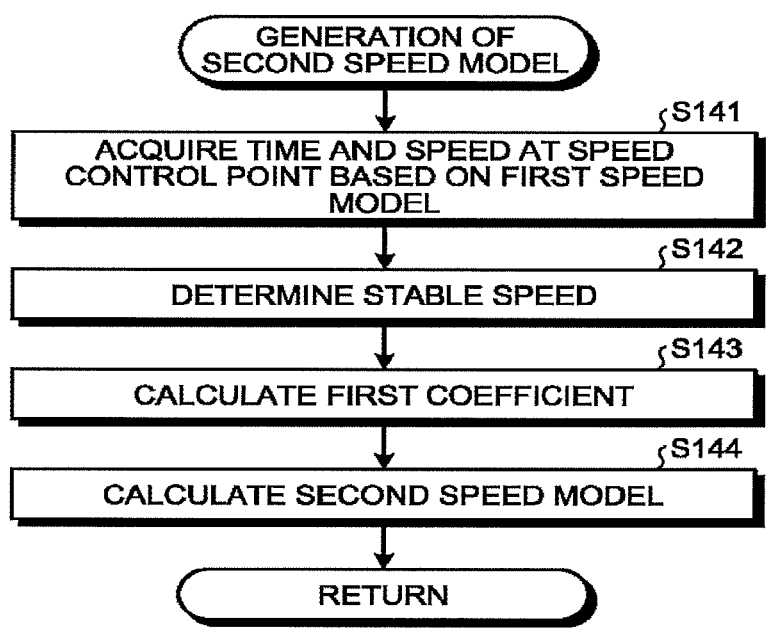
FIG. 10 is a flowchart illustrating a flow of a generation process of the second speed model.

FIG. 10 is a flowchart illustrating the flow of the generation process of the second speed model. In a case where the second speed model is represented by a cubic function, the model generation unit 52 generates the second speed model with the flow of the process illustrated in FIG. 10.

First, in step S141, the model generation unit 52 obtains the time and the speed at the speed control point based on the first speed model.

Subsequently, in step S142, the model generation unit 52 determines the stable speed. The stable speed is a speed of a moving object in a case where the moving object moves at a constant speed on a road (traveling road) (in a case where the moving object moves at the acceleration of zero). For example, the stable speed may be a legal speed or may be a value estimated from data obtained by actually measuring a moving object passing through the intersection.

Subsequently, in step S143, a first coefficient of the second speed model represented by a cubic function is calculated. The first coefficient is a coefficient of a cubic term of the variable.

For example, the model generation unit 52 calculates the first coefficient of the second speed model based on the outflow speed and the distance from the sidewalk-roadway boundary line. For example, the model generation unit 52 sets, as the first coefficient, a value obtained by adding values obtained by multiplying the outflow speed and the distance from the sidewalk-roadway boundary line by their corresponding coefficients and further adding a constant to the addition result. More specifically, the following Mathematical Formula (2) is calculated.

$$a'=b_1Y_1+b_2Y_2+b_3 \qquad (2)$$

In the Mathematical Formula (2), a' indicates the first coefficient of the second speed model. $Y_1$ indicates the outflow speed. $Y_2$ indicates the distance from the sidewalk-roadway boundary line.

$b_1$ and $b_2$ are coefficients and $b_3$ is a constant. These coefficients and constant are values estimated from the data obtained by actually measuring the moving object passing through the intersection. These coefficients and constant are included in, for example, the intersection information. The model generation unit 52 acquires these coefficients and constant from the intersection information.

The outflow speed may be t stable speed calculated in step S142. The non-patent literature (Axel Wolfermann, Wael K. M. Alhajyaseen, Hideki Nakamura, "MODELING SPEED PROFILES OF TURNING VEHICLES AT SIGNALIZED INTERSECTIONS", International Conference on Road Safety and Simulation (RSS2011)) discloses that the first coefficient of the second speed model can be estimated based on the outflow speed and the distance from the sidewalk-roadway boundary line.

Subsequently, in step S144, the model generation unit 52 calculates the second speed model which is a cubic function based on the time at the speed control point, the speed at the speed control point, the stable speed, and the first coefficient. The model generation unit 52 can uniquely determine the second speed model which is a cubic function by using the time at the speed control point, the speed at the speed control point, the stable speed, and the first coefficient.

When step S144 is ended, the model generation unit 52 ends the generation process of the second speed model.

Figure 11:
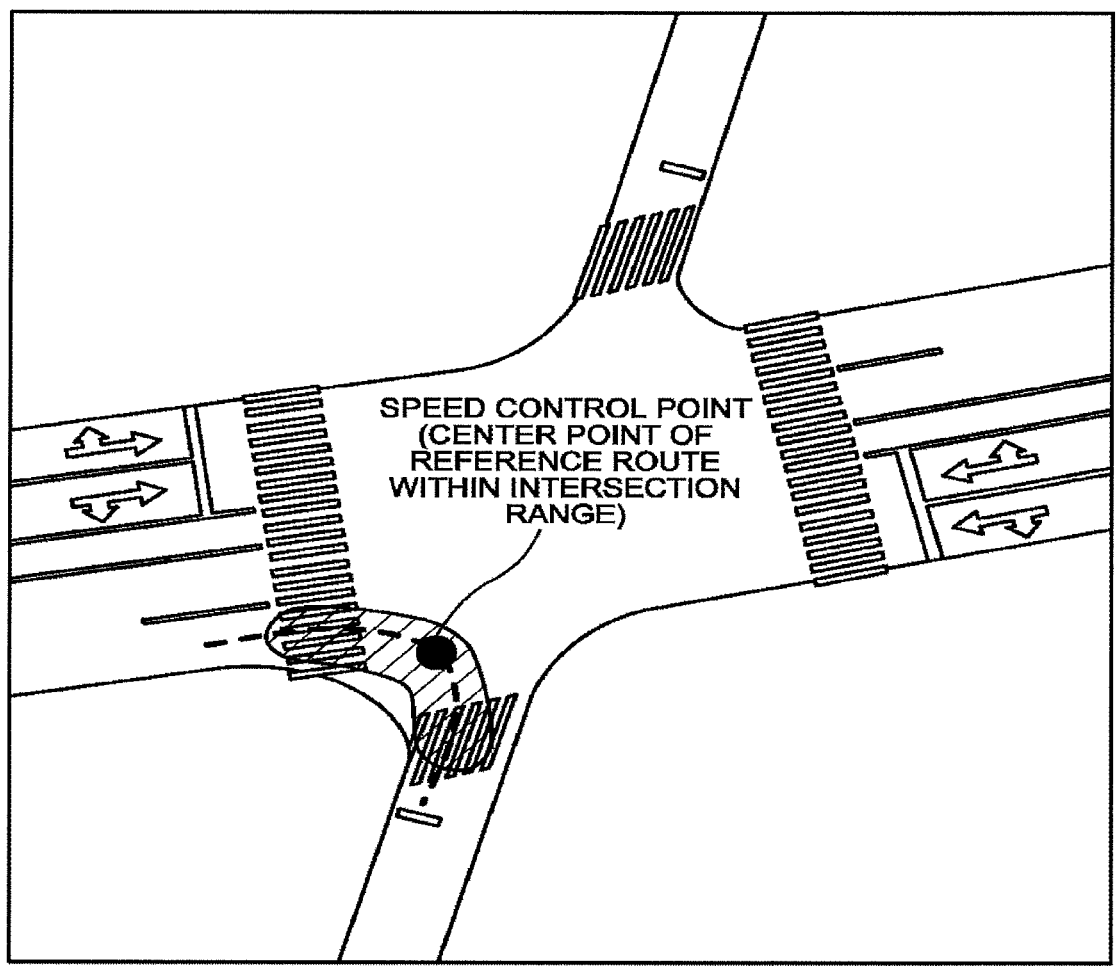
FIG. 11 is a view illustrating a speed control point according to Modified Example 1.

FIG. 11 is a diagram illustrating a speed control point according to Modified Example 1. Instead of detecting the position having the maximum curvature as the speed control point, the control point detection unit 50 may detect a center point within the intersection of the reference routes as the speed control point. For example, the control point detection unit 50 detects, as the speed control point, a center point between the position at which the curvature on the inflow port side of the reference route becomes equal to or larger than a predetermined value and the position at which the curvature on the outflow port side of the reference route becomes smaller than the predetermined value.

For example, in a case where the reference route is an arc and the curvature is substantially constant, the center point within the intersection of the reference route becomes the position at which the positive or negative sign of the acceleration of the moving object is reversed. Therefore, in such a case, the control point detection unit 50 can accurately detect the position at which the positive or negative sign of the acceleration of the moving object is reversed by setting the center point within the intersection of the reference route as the speed control point.

Figure 12:
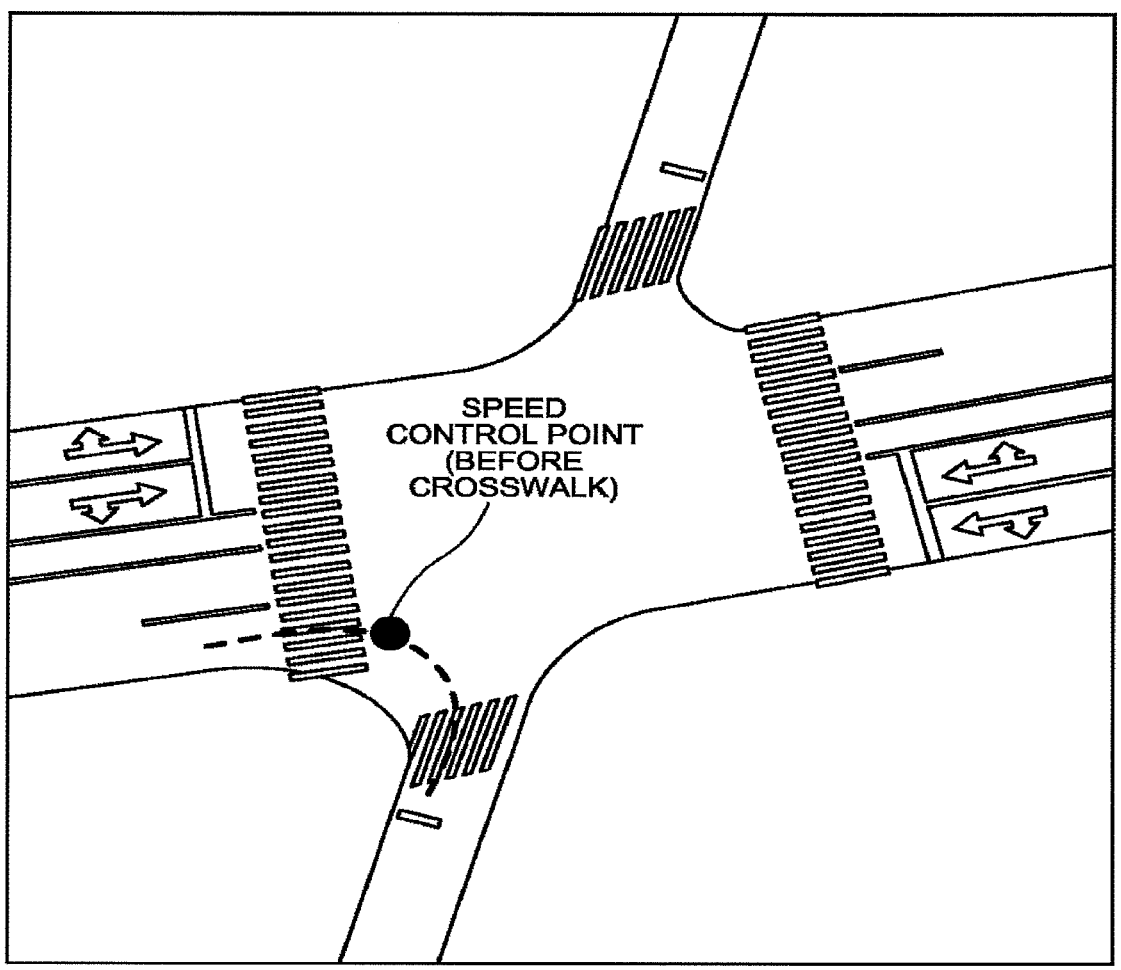
FIG. 12 is a diagram illustrating a speed control point according to Modified Example 2.

FIG. 12 is a diagram illustrating a speed control point according to Modified Example 2. Instead of detecting the position having the maximum curvature as the speed control point, the control point detection unit 50 may detect, as the speed control point, a position before the crosswalk by a predetermined distance in the reference route. For example, the control point detection unit 50 acquires the content and display position of the road sign included in the intersection information and detects the position before the crosswalk by the predetermined distance.

For example, in a case where the moving object passes through a high-traffic intersection or an intersection with poor view, the speed of the moving object is minimized just before the crosswalk. Therefore, in such a case, the control point detection unit 50 sets, as the speed control point, a position before the crosswalk by a predetermined distance. With this, the control point detection unit 50 can accurately detect the position at which the positive or negative sign of the acceleration of the moving object is reversed. The distance from the crosswalk to the speed control point may be included in the intersection information or may be registered in advance in the control point detection unit 50.

As described above, the information processing apparatus 10 according to the present embodiment specifies the reference route along which the target moving object is predicted to travel and detects the speed control point based on the specified reference route. Then, the information processing apparatus 10 generates a speed model representing the temporal change in the predicted speed of the target moving object so that the speed at the speed control point is locally minimised. Therefore, according to the information processing apparatus 10, it is possible to accurately calculate the predicted speed of the target moving object traveling at the intersection.

The programs executed by the information processing apparatuses 10 according to the embodiments and the modifications described above may be stored on a computer connected to a network such as the Internet and downloaded via the network so that the program is provided. The programs executed by the information processing apparatuses 10 according to the embodiments and the modifications described above may be provided or distributed via a network such as the Internet. The programs executed by the information processing apparatuses 10 according to the embodiments and the modifications described above may be provided in a form of being incorporated in advance into a nonvolatile recording medium such as a ROM.

Furthermore, each of the embodiments and modifications described above may be arbitrarily combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
processing circuitry configured to
acquire a dynamic state related to traveling of a moving object entering an intersection, the dynamic state including observation data of a speed of the moving object at least at one point in time;
acquire intersection information indicating a configuration of the intersection;
specify a reference route along which the moving object is predicted to travel at the intersection, based on the dynamic state and the intersection information;
detect a speed control point that is a position included in the specified reference route;
generate, based on the dynamic state and the intersection information, a first speed model representing a temporal change in a predicted speed of the moving object up to the speed control point and having the speed at the speed control point being locally minimized, and a second speed model representing a temporal change in the predicted speed of the moving object after the speed control point and having the speed at the speed control point being locally minimized; and
generate and display, on a display of a vehicle, a predicted trajectory of the moving object, based on the first speed model and the second speed model,
wherein in the generating of the first speed model, the processing circuitry is further configured to
estimate an initial estimated speed of the moving object at the speed control point; and
optimize the first speed model to reduce an error with respect to the initial estimated speed of the moving object at the speed control point and the observation data of the speed of the moving object at least at the one point in time.

2. The apparatus according to claim 1, wherein the processing circuitry is further configured to detect, as the speed control point, a position at which a positive or negative sign of an acceleration of the moving object is reversed.

3. The apparatus according to claim 1, wherein the processing circuitry is further configured to detect, as the speed control point, a position at which a curvature in the reference route is maximized.

4. The apparatus according to claim 1, wherein the processing circuitry is further configured to detect, as the speed control point, a center point in the reference route.

5. The apparatus according to claim 1, wherein the processing circuitry is further configured to detect, as the speed control point, a position before a crosswalk by a predetermined distance in the reference route.

6. The apparatus according to claim 1, wherein the processing circuitry is further configured to optimize the first speed model under a constraint condition that a route length of the reference route between a position of the moving object at a reference time and the speed control point is matched with an integral value of the first speed model from the reference time to a time at which the speed is locally minimized.

7. The apparatus according to claim 6, wherein
the first speed model is a cubic function with time as a variable, and
the processing circuitry is further configured to optimize the first speed model under a constraint condition that there is no other extremum from the reference time to the time at which the speed is locally minimized.

8. The apparatus according to claim 7, wherein the processing circuitry is further configured to optimize the first speed model so that a square error is minimized under a constraint condition with respect to observation data of an initial estimated speed of the moving object at the speed control point and the speed of the moving object at the at least one point in time.

9. The apparatus according to claim 1, wherein the processing circuitry is further configured to:
acquire an inflow speed, the inflow speed being a speed of the moving object at the time of entering the intersection;
acquire an intersection angle at the intersection, a radius of a corner, and a distance from a sidewalk-roadway boundary line on the reference route; and
calculate the initial estimated speed of the moving object at the speed control point based on the inflow speed, the intersection angle, the radius of the corner and the distance from the sidewalk-roadway boundary line.

10. The apparatus according to claim 1, wherein, when an acceleration calculated from the optimized first speed model is outside a predetermined range, the processing circuitry is further configured to change the position of the speed control point and optimizes the first speed model again.

11. The apparatus according to claim 1, wherein the processing circuitry is further configured to generate the second speed model based on a stable speed at which an acceleration of the moving object is zero and a time and speed of the moving object at the time of passing the speed control point calculated from the optimized first speed model.

12. The apparatus according to claim 11, wherein
the second speed model is a cubic function having time as a variable, and
the processing circuitry is further configured to calculate a coefficient of a cubic term of the variable in the second speed model based on the stable speed and a distance from the sidewalk-roadway boundary line.

13. The apparatus according to claim 1, the processing circuitry is further configured to control a driving mechanism to drive a vehicle based on the first speed model and the second speed model.

14. A vehicle equipped with the information processing apparatus according to claim 1.

15. An information processing method, comprising:
acquiring a dynamic state relating to traveling of a moving object entering an intersection, the dynamic state including observation data of a speed of the moving object at least at one point in time;
acquiring intersection information indicating a configuration of the intersection;
specifying a reference route along which the moving object is predicted to travel at the intersection, based on the dynamic state and the intersection information;
detecting a speed control point that is a position included in the specified reference route;
generating, based on the dynamic state and the intersection information, a first speed model representing a temporal change in a predicted speed of the moving object up to the speed control point and having the speed at the speed control point being locally minimized, and a second speed model representing a temporal change in the predicted speed of the moving object after the speed control point and having the speed at the speed control point being locally minimized; and
generating and displaying, on a display of a vehicle, a predicted trajectory of the moving object, based on the first speed model and the second speed model,
wherein the step of generating of the first speed model further includes
estimating an initial estimated speed of the moving object at the speed control point; and
optimizing the first speed model to reduce an error with respect to the initial estimated speed of the moving object at the speed control point and the observation data of the speed of the moving object at least at the one point in time.

16. A non-transitory computer-readable medium containing a computer program that, when executed by a computer, causes the computer to execute a method comprising:
acquiring a dynamic state relating to traveling of a moving object entering an intersection, the dynamic state including observation data of a speed of the moving object at least at one point in time;
acquiring intersection information indicating a configuration of the intersection;
specifying a reference route along which the moving object is predicted to travel at the intersection, based on the dynamic state and the intersection information;
detecting a speed control point that is a position included in the specified reference route;
generating, based on the dynamic state and the intersection information, a first speed model representing a temporal change in a predicted speed of the moving object up to the speed control point and having the speed at the speed control point being locally minimized, and a second speed model representing a temporal change in the predicted speed of the moving object after the speed control point and having the speed at the speed control point being locally minimized; and generating and displaying, on a display of a vehicle, a predicted trajectory of the moving object, based on the first speed model and the second speed model, wherein the step of generating the first speed model further includes estimating an initial estimated speed of the moving object at the speed control point; and optimizing the first speed model to reduce an error with respect to the initial estimated speed of the moving object at the speed control point and the observation data of the speed of the moving object at least at the one point in time.

17. The vehicle of claim 14, wherein the processing circuitry is further configured to generate the first and second speed models of the temporal change of the predicted speed of the moving object, which is an object other than the vehicle.

18. The vehicle of claim 14, wherein the processing circuitry is further configured to acquire the dynamic state of the moving object, which is an object other than the vehicle, from sensors located on the vehicle, at a time when the moving object is entering the intersection.

\* \* \* \* \*